United States Patent [19]

Cook

[11] 3,973,699

[45] Aug. 10, 1976

[54] LIQUID DISPENSING APPARATUS UTILIZING DOUBLE ACTING PISTON

[75] Inventor: John H. Cook, Sawbridgeworth, England

[73] Assignee: Xerox Corporation, Stamford, Conn.

[22] Filed: June 11, 1974

[21] Appl. No.: 478,183

[30] Foreign Application Priority Data

Dec. 21, 1973 United Kingdom .............. 59529/73

[52] U.S. Cl. ................................ 222/108; 222/130; 222/327; 222/390; 222/541; 222/DIG. 1; 141/27

[51] Int. Cl.$^2$ ........................................ G01F 11/02

[58] Field of Search ........... 222/108, 109, 130, 318, 222/390, 451, 386, 325, 327, 478, 541, DIG. 1; 141/27

[56] References Cited

UNITED STATES PATENTS

| | | | |
|---|---|---|---|
| 1,183,185 | 5/1916 | Gill | 222/390 |
| 1,265,533 | 5/1918 | Searle | 222/386 |
| 1,751,693 | 3/1930 | Gentle | 222/390 |
| 2,029,055 | 1/1936 | Burke | 222/390 |
| 3,367,746 | 2/1968 | Maurukas | 141/27 X |
| 3,677,444 | 8/1972 | Merrill | 222/541 |

*Primary Examiner*—Robert B. Reeves
*Assistant Examiner*—Frederick R. Handren
*Attorney, Agent, or Firm*—J. J. Ralabate

[57] ABSTRACT

A development system for use in electrostatographic automatic imaging machines is described. The system includes an apparatus comprising a cartridge having a tubular housing with a piston slideably mounted in the housing defining a set of chambers and means adapted for engagement with an external drive for advancing the piston along the housing. Outlet and inlet means communicating with chambers respectively have means for sealing the inlet and outlet means are also provided. This apparatus comprises a liquid developer system to develop latent images on a photoconductive surface in an expedient fashion which avoids spillage of the liquid developer.

9 Claims, 5 Drawing Figures

FIG. 4
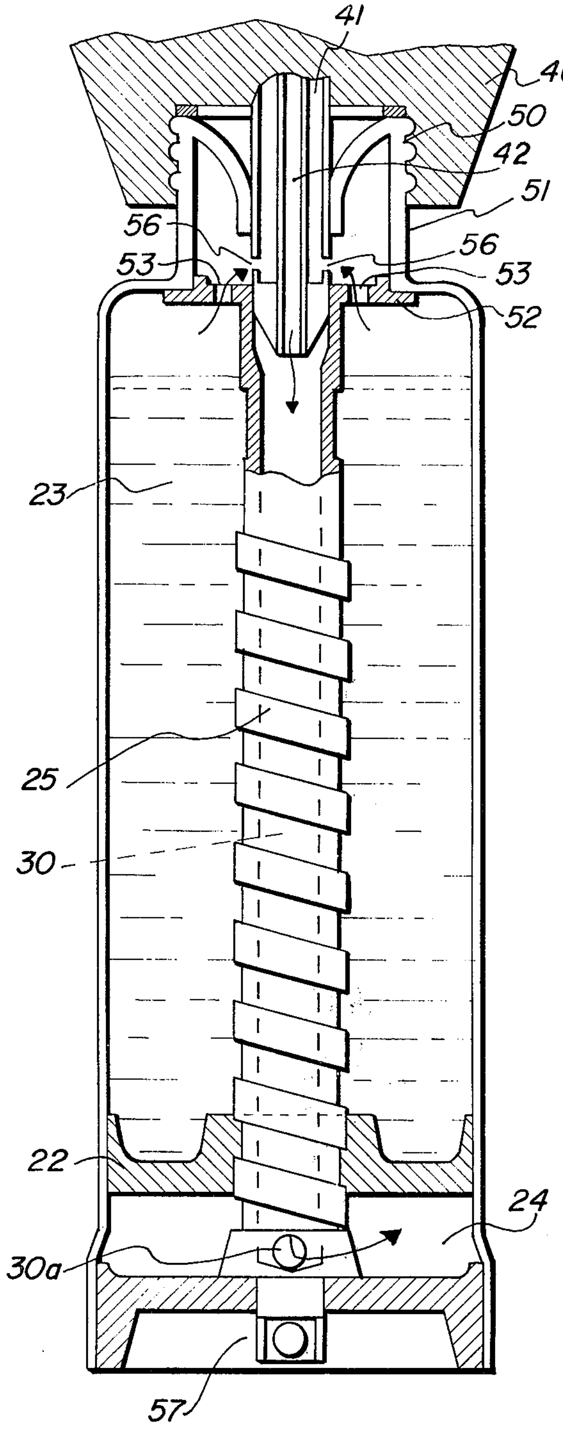
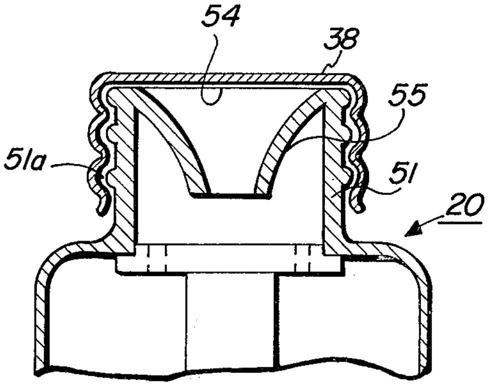
FIG. 5

LIQUID DISPENSING APPARATUS UTILIZING DOUBLE ACTING PISTON

This invention relates to the dispensing of liquids and more particularly to cartridges for replenishing the supply of liquid in a dispensing system. The invention is particularly but not exclusively concerned with cartridges for use in liquid development systems of electrostatographic reproduction apparatus.

One of the major problems associated with any machine having a liquid supply which requires replenishment at intervals is the achievement of quick and clean replenishment of the liquid supply, and this is a particular problem where the nature of the liquid is such that it will damage or soil the exposed parts of the apparatus or the environment. This is a particular problem with apparatus such as electrostatographic reproduction apparatus which are usually located in an office environment and it is desirable that the replenishment of the liquid be effected by an operator. One solution is to provide a fixed reservoir within the apparatus and to devise some means for replenishing the reservoir. However, in some apparatus employing liquid dispensing, such as electrostatographic reproduction apparatus utilizing liquid development, it is sometimes necessary also to remove contaminated or waste liquid.

It is therefore an object of this invention to provide a novel liquid dispensing system devoid of the above noted deficiencies.

A further object of this invention is to provide a novel development system.

Yet another object of this invention is to provide a liquid dispensing system satisfactory for use in automatic electrostatographic imaging device.

A further object of this invention is to provide a liquid cartridge which can be inserted into a liquid dispensing apparatus to form a reservoir of the liquid which can also be used for removing waste liquid.

These and other objects are accomplished generally speaking by providing a cartridge for liquids comprising a tubular housing, a piston slideably mounted in said housing and defining first and second chambers, means adapted for engagement with an external drive means for advancing the piston along the housing, outlet and inlet means communicating with the first and second chambers respectively, and means for sealing the outlet and inlet means.

In another embodiment, the invention provides a charged cartridge as described above in which the piston is arranged at or adjacent that end wall of the housing which defines with the piston the second chamber and the first chamber and contains a liquid. In use, a charged cartridge of this invention is arranged in a receptor machine or system with the piston advancing means in driving engagement with suitable drive means in the machine and the outlet and inlet means are connected to liquid supply and return lines respectively. As the piston is advanced, liquid in the first chamber is forced out through the supply line and the second chamber increases in size to accommodate any waste liquid returned through the return line. Thus the need for a separate feed pump for the liquid is eliminated and at the same time the pressure drop in the second chamber caused by the enlargement thereof as the piston is advanced, has the effect of drawing waste liquid into it through the return line. The means sealing the inlet means of the cartridge avoid the risk of liquid spillage during storage and transport prior to use. The sealing means may take the form of a single cap sealing both the inlet and outlet or two caps for the inlet and outlet respectively, the cap or caps being removed prior to insertion of the cartridge in the receptor machine. However, preferably the sealing means comprises frangible seals in the inlet and outlet respectively which can be broken by the connection of the supply and return lines therewith. Of, if the inlet and outlet are adjacent, a single frangible seal may be provided. For example, the inlet and outlet means may be concentric and adapted to connect with concentrically arranged supply and return lines of the receptor machine. Or the inlet and outlet may be provided with valves which are adapted to be opened by the connection of the inlet and outlet with the return and supply lines respectively.

It will be apparent that the risk of liquid spillage from a cartridge of this invention during loading and unloading is small and may be eliminated entirely. Thus with a cartridge in which frangible seals are provided in the inlet and outlet, no liquid can be spilled during loading and by arranging the inlet and outlet in the top of the cartridge the likelihood of spillage during unloading will be minimal. In such case the risk may be further reduced by providing seals that will tend to close upon removal of the liquid lines during unloading. If valves are provided in the inlet and outlet which are open only when connected with the liquid lines, the risk of spillage from the cartridge can be entirely eliminated. It is envisaged that a charged cartridge of this invention before any liquid has been discharged may have the piston arranged against one end wall of the housing in which case the second chamber will have zero volume and the references herein and in the claims to the second chamber are to be understood in this context.

This invention also provides a liquid dispensing apparatus adapted to receive a cartridge as described above and having drive means adapted to engage said piston advancing means and liquid supply and return lines adapted to connect with said outlet and inlet means of the cartridge respectively.

Preferably, the supply and return lines include valve means which may be manually operated or operated by the connection of the lines with the outlet and inlet means, for sealing the lines in the absence of a cartridge. While this invention has broad application to the dispensing of liquids in general it is particularly suitable for use in liquid development systems of electrostatographic reproduction machines where the nature of the developer and the machines themselves as well as their environment is such as to make spillage extremely undesirable.

Thus, from another aspect the invention provides, in or for an electrostatographic reproduction machine, a development system for applying a liquid developer to a latent image on a photoconductive surface to develop said latent image, comprising apparatus as described above.

The invention having been described in general terms the specifics of the instant invention will be more readily understood by reference to the drawings which follow of which FIG. 1 is a schematic illustration of the operation of an electrostatographic reproduction machine to which this invention is applicable;

FIGS. 4 and 5 are cross-sections of a second embodiment of cartridge according to the invention.

Figure 1:
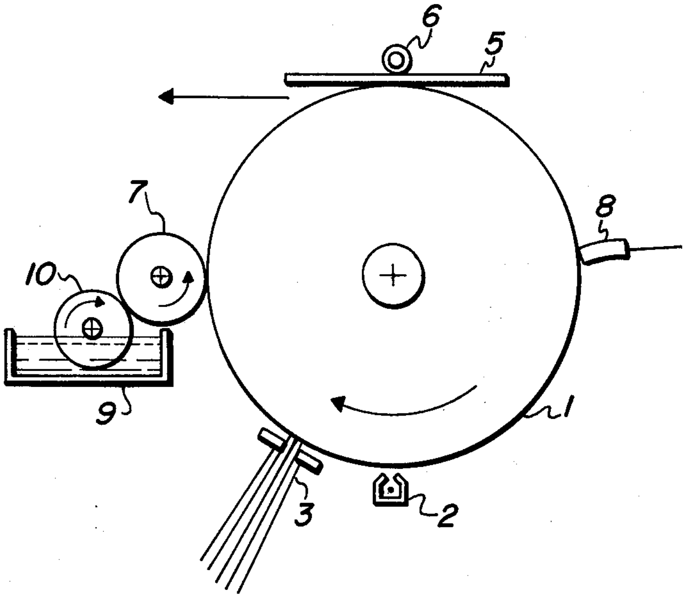

Referring to the drawings, the general operation of an electrostatographic machine as illustrated will first be described with reference to FIG. 1. A photoreceptor shown in the form of drum 1 is first uniformly charged at a charging station 2 and the surface then exposed at an exposure station 3 to a light pattern of the image sought to be reproduced thereby discharging the charge in the areas where light strikes the photoreceptor. The uncharged areas of the surface thus form an electrostatic charge pattern in conformity with the configuration of the original image pattern.

The electrostatic latent image is then developed into visible form by a development system 4 by applying liquid developer material to the plate. Subsequent to the development operation the now visible image is transferred from the plate to a sheet of final support material 5, such as paper or the like, thereby forming a permanent print, at a transfer station schematically illustrated by a transfer roll 6.

The development system of the illustrated embodiment employs the techniques described in British Patent Specification No. 880,597 in which the liquid developer is applied to the photoreceptor by means of an applicator, which in this embodiment is in the form of a roll 7 having a peripheral surface comprising lands and valleys such that the liquid developer is contained in the valleys out of contact with the photoreceptor, while the surfaces of the lands are in contact with the photoreceptor. In such an arrangement, the liquid developer is attracted from the valleys to the electrostatic latent image in image configuration. The illustrated embodiment exemplifies a typical example of such an arrangement in which the applicator is a rigid cylindrical member 7 having on its surface a pattern of grooves and ridges which comprise the lands and valleys respectively, the liquid developer being maintained in the valleys below the surfaces of the lands.

As a photoreceptor surface bearing the electrostatic latent image and the applicator are brought into moving contact the liquid developer is drawn to the photoceptor from the valleys of the applicator roll by the charges which form the electrostatic latent image.

Following transfer, the surface of the photoreceptor is cleaned at a cleaning station 8 to remove residual developer material from the surface by means of a cleaning blade shown arranged at a leading angle to the direction of rotation of the photoreceptor.

Figure 2:
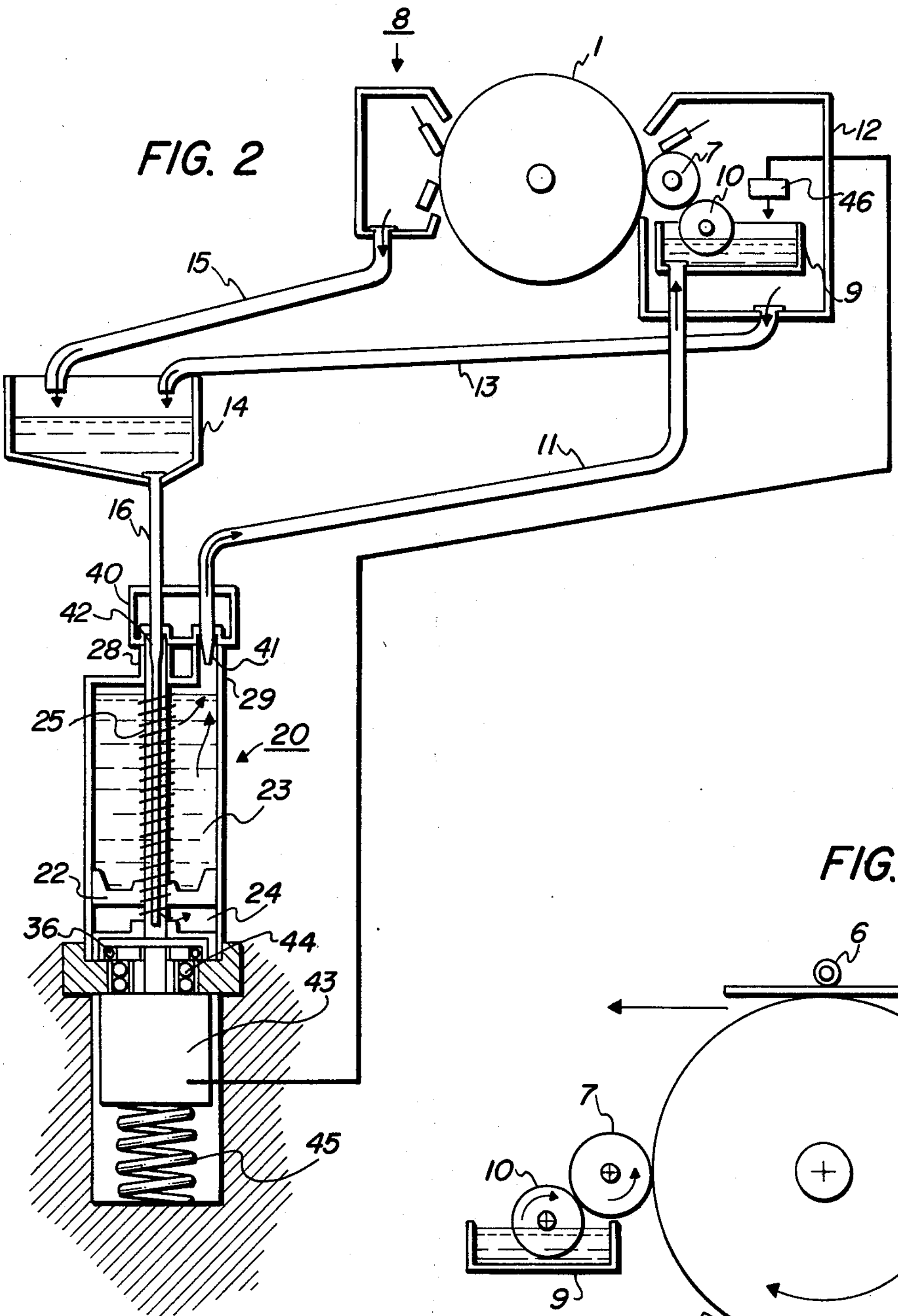
FIG. 2 is a schematic illustration of a liquid development system for the electrostatographic reproduction apparatus of FIG. 1 and incorporating a cartridge according to this invention.

In FIG. 2 is seen a development system employing the liquid dispensing system of the instant invention. It comprises a tray 9 in which is disposed the lower portion of a developer supply roll 10, the peripheral surface of which is arranged in liquid transfer relationship with the peripheral surface of the applicator roll 7 which is in operation, arranged in pressure contact with the surface of the drum 1 and means are provided for driving both of the rolls 7 and 10 in rotation. Liquid developer is supplied to the tray 9 through a supply line 11 from a cartridge 20 of this invention which is described below. Liquid which overflows the tray 9, e.g., due to being supplied in excess to requirements or because the system is tipped through an angle, falls into a container 12 surrounding the tray 9 so dimensioned and disposed around the tray 9 as to prevent the spillage of developer when the system is tilted through up to a specified angle, e.g., 45°, in any plane and drains through a drain pipe 13 into a sump 14. Residual developer cleaned from the photoreceptor at the cleaning station also drains into the sump through a drain pipe 15. Liquid in the sump 14 is discharged into the cartridge through a line 16 as described below.

Figure 3:
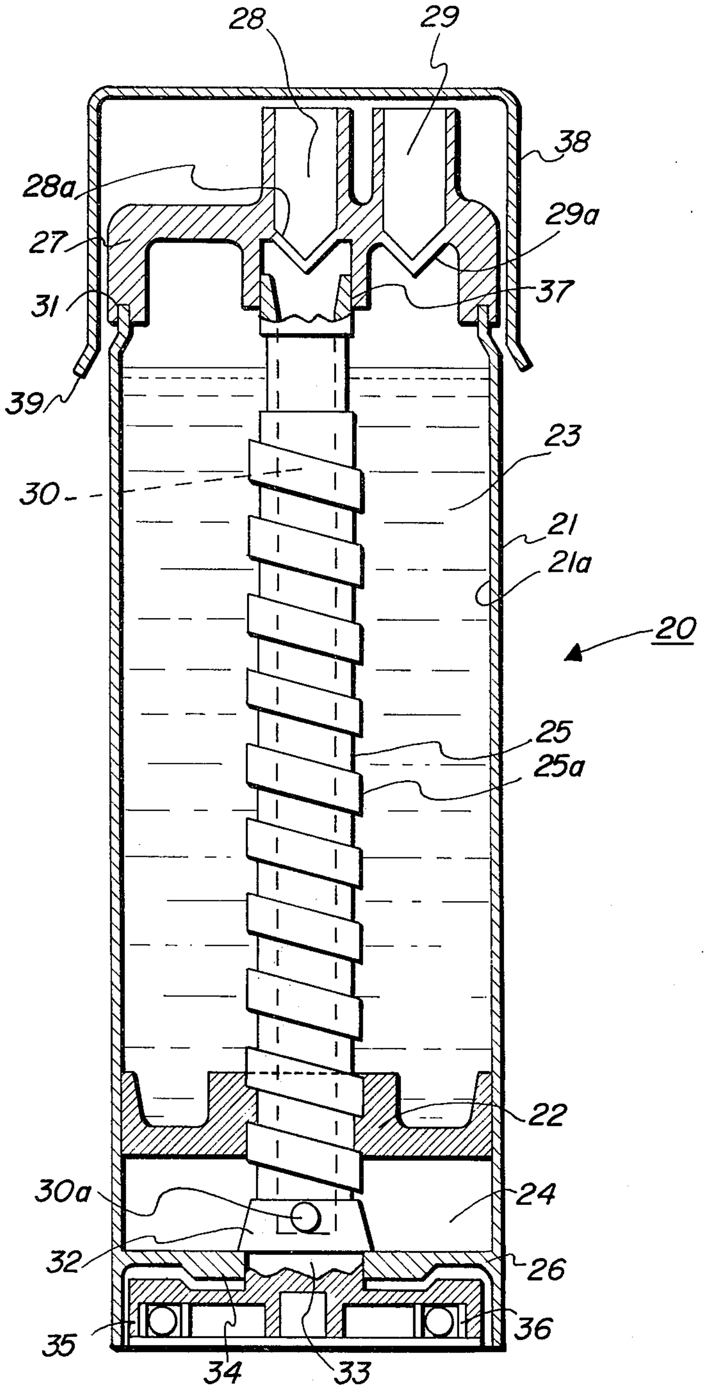
FIG. 3 is a cross-section of one emboodiment of cartridge according the invention and which is also shown in FIG. 2.

In FIG. 3 is seen a cartridge according to this invention. The cartridge comprises a tubular housing 21, a piston 22 slideably mounted in said housing in sealing engagement with the internal wall surface of the tubular housing and defining first and second chambers 23 and 24, and lead screw 25 extending between the ends 26 and 27 of the housing for advancing the piston 22 along the housing. The lead screw extends out of the end 26 of the housing and is adapted to engage an external drive means for rotating the lead screw to drive the piston. The end 27 of the housing is provided with an inlet 28 and an outlet 29 communicating respectively with the second and first chambers 24 and 23. Each of the inlet and outlet includes a frangible sealing membrane 28*a* and 29*a*. The outlet 29 communicates with the chamber 23 directly and the inlet 28 communicates with the chamber 24 through a bore 30 in the lead screw 25 and an opening 30*a* through the wall of the hollow lead screw adjacent the end wall 26.

The housing 21 comprises a tubular side wall portion having an internal, inwardly directed, annular flange at one end defining the end wall 26. The other end wall 27 comprises a separate piece including a peripheral groove 31 which receives the end of the tubular housing wall 21*a* and the inlet 28 and outlet 29. The lead screw 25 has a helical thread 25*a* on which is mounted in sealing relationship therewith the piston 22 which may if desired have a detent (not shown) engaging in a guide groove (also not shown) in the wall 21*a* of the housing to prevent it rotating as it is advanced by rotation of the lead screw. The thread 25*a* terminates adjacent the end wall 26 and the lead screw is provided here with a frustoconical portion 32 containing the opening 30*a*. A cylindrical portion 33 of the lead screw extends from the back of the portion 32 and carries a flange 34 which includes a peripheral skirt portion 35 having teeth 36 on the internal periphery thereof defining a drive gear. The cylindrical portion 33 of the lead screw sealingly engages the inner periphery of the annular flange 26 which defines a bearing surface for the one end of the lead screw. The frustoconical shape of portion 32 assists in assembly of the cartridge.

The other end of the lead screw 25 bears in a circular recess 37 in the end piece 27 opposite the inlet 28 such that the bore 30 in the lead screw is opposite the inlet.

From the above description it will be apparent that the cartridge comprises only 4 individual parts, that is the tubular wall 21*a*, the lead screw 25, the piston 22 and the end piece 27. These are preferably all of plastics material, such as polyvinylchloride of various grades of hardness.

During assembly of the cartridge liquid is introduced into the chamber 23, the piston 22 being as near to the end 26 as possible, i.e., seating against the frustoconical portion 32, before the end piece 27 is fitted. During transport and storage the sealing membranes 28*a*, 29*a* are protected against accidental breakage by a cap 38 which is a force fit over the end piece 27 and has a lip 39 engaging behind the latter.

The loading and operation of the cartridge illustrated in FIG. 3 will now be described with reference to FIG. 2. The development system illustrated in FIG. 2 includes a fixed valve unit 40 having nozzles 41 and 42 of the supply line 11 to the tray 9 and of the return line 16 from the sump 14 respectively, depending therefrom and an opposed spring-mounted drive unit 43 having a dog 44 adapted to engage the gear 36 on the cartridge. The cap 38 of the cartridge is removed and the drive unit 43 is depressed e.g., by pressing the cartridge 20 down on it. Once the cartridge is arranged in position on the drive unit it is released so that it will rise under the pressure of the spring 45 so that the nozzles 41 and 42 enter the outlet 29 and inlet 28 respectively, the spring 45 applying sufficient load to the cartridge to cause the membranes 28*a*, 29*a* to be pierced. Loading is now complete and the machine may be used. As illustrated, the drive unit is energized in response to the operation of a level sensor 46 which senses the level of the liquid in the tray 9 and when the level of liquid developer in tray 9 drops to a predetermined level the drive unit is energized and liquid developer is forced from the cartridge through the outlet 28 and the supply line 11 into the tray. The pressure drop caused by movement of the piston is employed to draw waste developer from the sump 14 into the chamber 24. In the event of failure of the level sensor, excess liquid developer supplied to the developer unit is drawn back into the chamber 24 via the sump. To avoid damage when the piston reaches the limit of its travel or the possibility of the operator inadvertently winding the piston back during removal of a used cartridge, the thread 25*a* of the lead screw 25 terminates short of that end of the screw 25 adjacent the end wall 27 such that the piston becomes disengaged from the screw thread. The cartridge is removed by pressing it downwards against the drive unit to disengage the inlet 28 and outlet 29 from the nozzles 42 and 41 tilting it out of alignment with the valve unit 40 and lifting it out. The valve unit 40 automatically closes the nozzles 41, and 42 upon release of the pressure exerted by the cartridge under the influence of the spring 45.

It will be seen that the risk of spillage of ink from the cartridge 20 during loading and unloading is minimal since during loading spillage is prevented by the sealing membranes 28*a*, 29*a* until these are pierced by the nozzles 42, 41 by which time the cartridge is firmly secured between the drive unit 43 and the nozzles 42, 41. Also, during unloading the risk of spilliage from the small inlet and outlets will be low and these can be quickly capped. Furthermore, by suitably shaping the sealing membranes, e.g., by giving them a conical configuration as shown in FIG. 3, the membranes will tend to close upon withdrawal of the nozzles and the risk of spillage will be reduced still further.

In FIG. 4 and 5 is seen a second embodiment of cartridge according to the invention. In this embodiment the inlet and outlet orifices 28, 29 are concentric permitting the cartridge to be screwed into a suitable screw threaded recess 50 in the bottom on the valve unit 40. In this embodiment the cartridge includes a neck portion 51, having screw threads 51*a* thereon, which is formed as a reduced diameter extension of the tubular wall of the cartridge and the end wall 26 is formed as a separate piece. Again in this embodiment the lead screw 25 is hollow but at its end adjacent the neck 51 it carries a radial flange 52 having apertures 53 therein surrounding the screw for discharge of the liquid developer from the chamber 23. The two sealing membranes 28*a*, 29*a* of the embodiment of FIG. 3 are replaced by a single sealing membrane 54 of foil over the top of the neck which is pierced by the insertion of the concentric nozzles 41, 42 which are integral. The foil 54 is protected during transport and storage by a screw-threaded cap 38. A flexible frustoconical collar 55 integral with a directed inwardly from the top of the neck 51 seals against the integral concentric nozzles 41, 42. As will be seen, the inner one 42 of the concentric nozzles, that is the one leading from the sump 14, extends into the upper end of the core 30 in the lead screw 25 and when sealing engages therewith while the outer nozzles has apertures 56 therein which communicate with the interior of the neck below the frustoconical cap portion 55, which when sealing engages around the nozzles, to receive liquid forced through the apertures 53 by the piston 22. In this embodiment the drive gear is replaced by a drive dog 57 formed as an extension of the lead screw 25 through an aperture in the end wall 26. The receptor machine will be provided with suitable drive means for engaging this drive dog.

For example, although in the embodiments illustrated the inlet and outlet orifices are closed by sealing membranes prior to loading in the machine, these orifices could be provided with valves which are adapted to be opened by the connection of the inlet and outlet orifices with the nozzle. Removal of the nozzles from the orifices would have the effect of permitting or causing the valves to close. This would eliminate the risk of liquid spillage from the cartridge. Further, although a level sensor has been described for sensing the level of liquid in the tray 9, the drive unit may be continuously energized so as to advance the piston at a predetermined low rate of advance, in which case a more efficient piston seal would be required to maintain a pressure differential on either side of the piston. In addition the cartridge may be disposed in a receptor machine in any desired attitude and the inlet and outlet need not be arranged adjacent to one another. For example, they may be provided in opposite end walls of the housing.

Anyone skilled in the art will have other modifications occur to him based on the teachings of the present invention. These modifications are intended to be encompassed within the scope of this invention.

What is claimed is:

1. A cartridge for liquids, comprising a tubular housing, a piston slideably mounted in said housing defining first and second chambers, means adapted for engagement with an external drive means for advancing said piston along said housing, outlet means communicating with said first chamber, inlet means at all times in communication with said second chamber, and means for sealing said outlet and inlet means, said sealing means comprising a frangible seal in each of the inlet and outlet means, said seals being of conical configuration and directed inwardly of the cartridge.

2. A charged cartridge as defined in claim 1, in which the piston is arranged adjacent to the end wall of the housing which defines with the piston said second chamber, and said first chamber contains a liquid.

3. A cartridge as defined in claim 1 in which the means for advancing the piston along the housing comprises a lead screw on which the piston is mounted said screw extending out of one end of the cartridge for engagement with an external drive means.

4. A cartridge as claimed in claim 3 in which the inlet and outlet are provided in the other end of the cartridge.

5. A cartridge as claimed in claim 4 in which said inlet communicates with said second chamber through a bore in said lead screw.

6. A liquid dispensing apparatus comprising means adapted to receive a a tubular housing, a piston slideably mounted in said tubular housing defining first and second chambers, means adapted for engagement with an external drive means for advancing said piston along said housing, outlet means communicating with said first chamber, said outlet means being connected to developer means adapted to develop an electrostatic latent image, inlet means at all times in communication with said second chamber, said inlet means being connected to developer sump means adapted to collect overflow liquid developer from said developer means and residual developer from a cleaning station, means for sealing said outlet and said inlet means, drive means adapted to engage said piston, liquid carrying lines adapted to connect with said outlet and inlet means of said tubular housing.

7. Apparatus as defined in claim 6 wherein said lines comprise valves adapted to be opened by the connection of said lines with said outlet and said inlet means of said tubular housing.

8. Apparatus as defined in claim 6 wherein said drive means is resiliently mounted.

9. A cartridge for liquids, comprising a tubular housing, a piston slideably mounted in said housing defining first and second chambers, means adapted for engagement with an external drive means for advancing said piston along said housing outlet means communicating with said first chamber, inlet means at all times in communication with said second chamber, and means for sealing said outlet and inlet means, wherein said inlet and outlet are concentric and said sealing means is a single frangible seal.

* * * * *